July 19, 1966 RYOZO KITAZAWA 3,261,608

RECORD PLAYER

Filed May 21, 1963 3 Sheets-Sheet 1

INVENTOR.
RYOZO KITAZAWA

BY

Hill, Sherman, Meroni, Gross & Simpson

ATTORNEYS

RECORD PLAYER

Filed May 21, 1963 3 Sheets-Sheet 2

INVENTOR.
RYOZO KITAZAWA
BY
Hill, Sherman, Meroni, Gross & Simpson
ATTORNEYS

July 19, 1966 RYOZO KITAZAWA 3,261,608

RECORD PLAYER

Filed May 21, 1963 3 Sheets-Sheet 3

INVENTOR.
RYOZO KITAZAWA
BY
Hill, Sherman, Meroni, Gross & Simpson
ATTORNEYS

United States Patent Office 3,261,608
Patented July 19, 1966

3,261,608
RECORD PLAYER

Ryozo Kitazawa, Kawasaki, Japan, assignor to Nippon Columbia Kabushikikaisha (Nippon Columbia Co., Ltd.), Kawasaki, Japan, a corporation of Japan
Filed May 21, 1963, Ser. No. 281,986
Claims priority, application Japan, Apr. 6, 1963, 38/18,469
5 Claims. (Cl. 274—9)

This invention relates to a portable record player which is small in size and handy to carry.

One object of this invention is to provide a small and compact portable record player in which a record may always be played even if the player case is supported in any condition.

Another object of this invention is to provide a small portable record player in which a pickup arm is shortened to enlarge the rotary angle of the arm.

A further object of this invention is to provide a record player in which when a player case is placed on a horizontal plane, namely in a normal condition the free end of a pickup is made to approach a record from underneath and a stylus is held on to the disc from underneath to play the record.

A yet further object of this invention is to provide a record player in which a pickup arm is brought automatically to a starting position of play coincidently with the operation of opening an outer lid and putting a record on a turntable and when closing the outer lid after putting the record on the turntable a window provided on an inner lid opens beneath the record and then the pickup arm is driven so that its free end having a stylus contacts to the surface of the record through the window at the starting point of play, thus playing the record.

Another object of this invention is to provide an automatic record player in which a knob is mounted on the shaft of a volume controller having a power source switch and a controlling device for controlling a transmission mechanism connecting a motor and a turntable is provided on the shaft, and by rotating the knob the transmission mechanism connects the motor and the turntable and at the same time a power source is supplied to the motor to revolve the turntable, thus starting to play the record.

Other objects, features and advantages of this invention will become apparent from the following description taken in conjunction with the accompanying drawings, in which, FIGURE 1 is a front view of a record player with an outer lid open;

Figure 1:
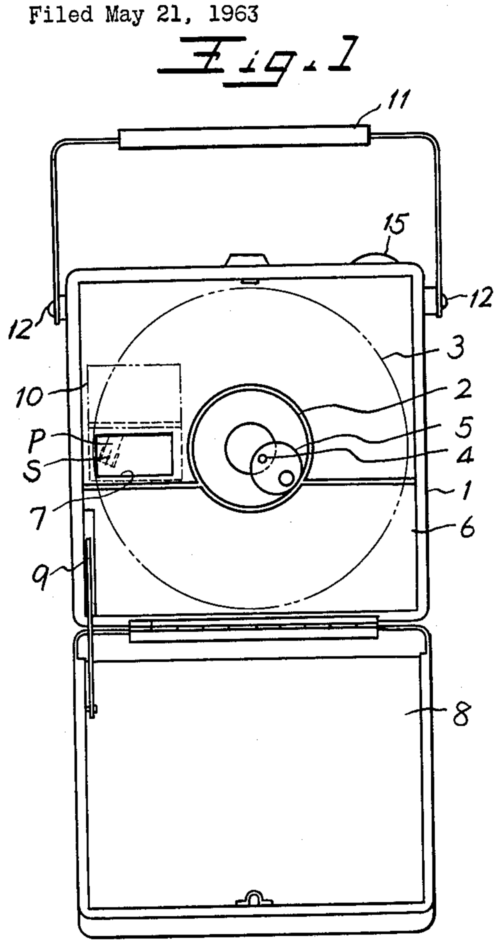

Referring to FIGURE 1, 1 is a case in which all the necessary parts are contained. 2 is a turntable and 3 is a record. A clamper 5 which turns around an eccentric shaft mounted on the surface of the turntable is provided so as to hold the record when the record is placed on the turntable. In FIGURE 1, the clamper has revolved from the center position and held down the record on the turntable.

The turntable 2 projects from an inner lid 6 and this lid is provided with a window 7 through which a stylus S of a pickup arm P makes contact with the record from underneath. The window 7 is shut by a sliding lid 10 through a lever 9 when an outer lid 8 is lifted as will be described later on. 11 is a handle which is pivoted on an axis 12 and in addition serves as a leg when it is pushed downwards.

Figure 2:
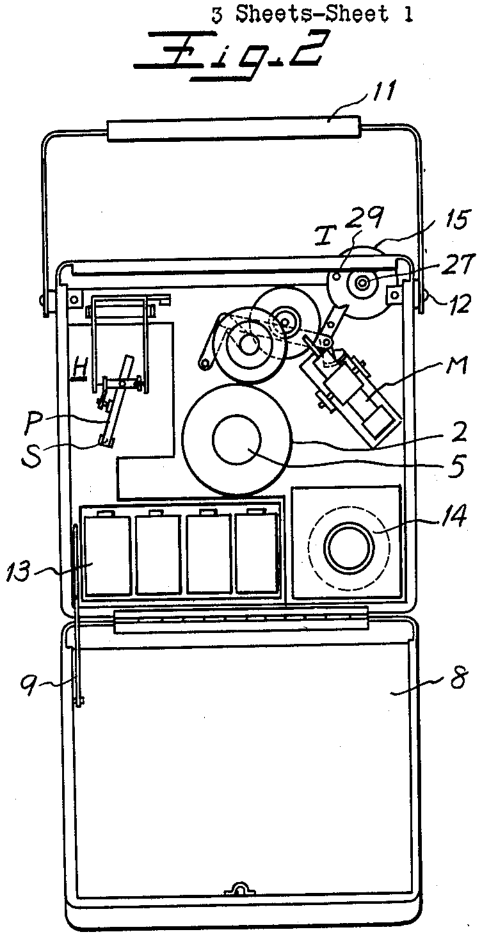
FIGURE 2 is a plan view schematically showing inner mechanisms of the player, having the outer and inner lids taken away.

FIGURE 2 shows the record player with the inner lid taken off, in which 13 is a battery, 14 is a speaker, M is a motor and T is a transmission mechanism which connects the motor and the turntable, which will become clear later on. A knob 15 is provided for operating the transmission mechanism. One portion of the outer periphery of the knob projects out from the case and it may be operated with a finger. H shows a supporting mechanism of the pickup arm P, which will also become apparent later on.

With reference to FIGURES 3, 4, 5 and 6 an example of the transmission mechanism T between the motor M and the turntable 2 will hereinafter be explained. The motor M is installed to turn on a horizontal axis 16 at its middle portion. Accordingly, the extended end of a shaft 17 of this motor is brought into contact with an intermediate wheel 18 and a spring 19 which is always biased upwards is provided for effecting the contact. On the shaft 20 of the intermediate wheel is mounted a wheel 21 with which an idler 22 is in contact rotatably. The idler is in turn mounted on a movable shaft 25 of an auxiliary arm 24 pivoted on a free end 23' of an arm 23 which is in turn pivoted on a shaft 22'. The shaft 25 is pulled in the direction of the arrow $a_1$ by a spring 26 one end of which is secured at a fixed part and hence the idler 22 is so constructed as to get in touch with the turntable 2.

Figure 3:
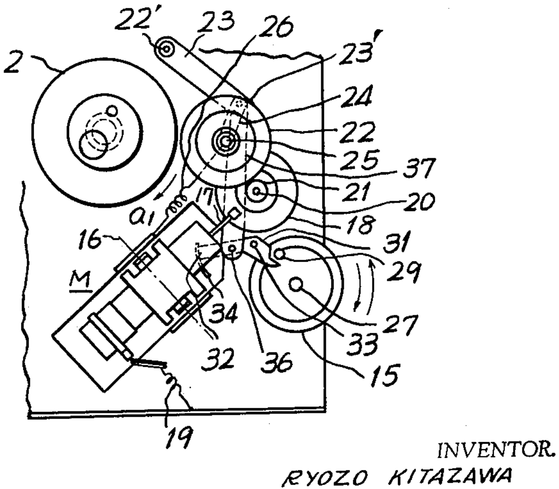
FIGURE 3 is a partial plan view of the record player, for explaining one example of a driving mechanism for driving a turntable with a motor, the turntable being disconnected from the driving part.
Figure 4:
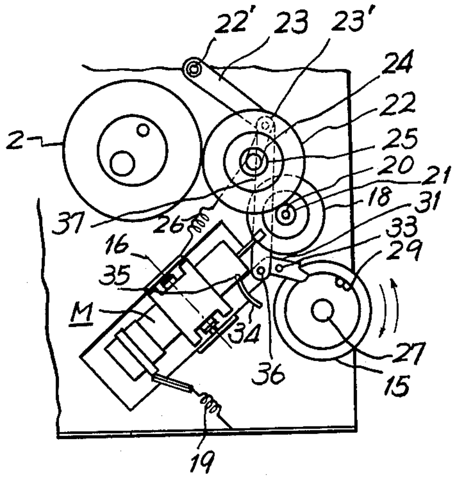
FIGURE 4 is a partial plan view like FIGURE 3, illustrating driving conditions of the turntable which is connected to the motor.
Figure 5:
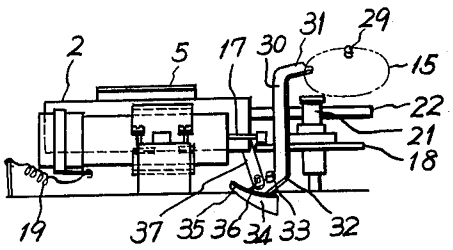
FIGURE 5 is a side view of the driving mechanism shown in FIGURE 3 viewed from the vertical direction with respect to the motor shaft.
Figure 6:
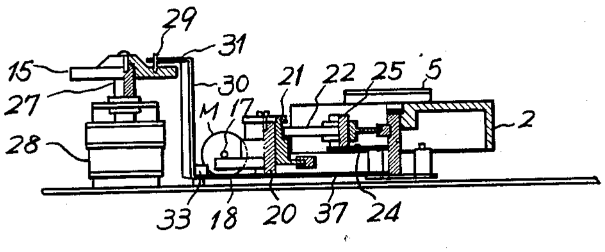
FIGURE 6 is a partial cross-sectional view of a mechanism for connecting the motor with the turntable and vice versa.

In order to couple this motor and the turntable with a transmission mechanism such as the aforementioned one a knob 15 is used one portion of which is exposed from one side of the case 1. The shaft 27 of this knob is provided with a volume controller 28 of an amplifier which serves also as a power source switch of the motor. On the upper face of this knob projects a projection 29 as well shown in FIGURE 5 and this projection 29 is made to engage with an upper horizontal portion 31 of a side lever 30. The side lever is pivoted on a shaft 33 at its lower horizontal portion 32 and a slanting control piece 34 is secured at the free end of the lower horizontal portion 32 and further a pivot 36 on the lower horizontal portion 32 is connected to the movable shaft 25 of the idler 22 by a connecting lever 37. Thus, when the knob 15 is rotated counterclockwise the projection 29 engages with the upper horizontal portion 31 of the side lever 30 to turn the side lever 30 round the shaft 33 against the elasticity of the spring 26 and then the narrow end portion 35 of the slanting control piece 34 is inserted under the motor M to separate the shaft 17 of the motor from the intermediate wheel 18. This is as shown in FIGURE 3 and in this case the transmission is not effected from the motor to the turntable. Turning the knob 15 clockwise, the idler 22 moves due to the tension of the spring 26 and comes in contact with the margin of the turntable 2 and further the connecting lever 37 connected to the shaft 23' of the arm of the idler 22 pushes the end portion of the horizontal portion 32 due to the force of the spring 26 to turn the slanting control piece 34 counter-clockwise around the shaft 33, releasing the slanting control piece 34 outward from the underside of the motor M. Accordingly the motor M is inclined by the force of the spring 19 and its shaft 17 gets into contact with the intermediate wheel 18, thereby connecting the motor and the turntable. When they are being connected, the shaft 27 of the knob 15 is in the predetermined rotating position owing to the rotation of the knob 15, accordingly the power source switch is turned "on" to flow a current to the amplifier and at the same time the motor M is switched on to rotate. The volume attached on the shaft 27 may be adjusted to be any desired amplifier level by controlling the knob 15.

The pickup arm P and means H for supporting it in this invention will hereinafter be explained.

Figure 7:
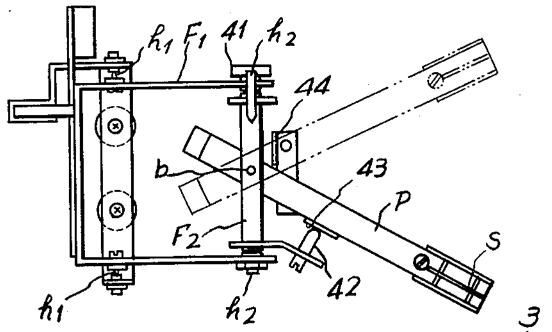
FIGURE 7 is a plan view illustrating a pickup arm and its supporting mechanism of this invention.
Figure 8:
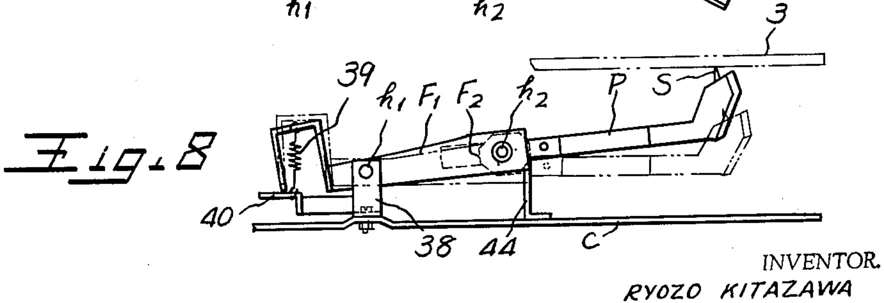
FIGURE 8 is its side sectional view.

Referring now to FIGURES 7 and 8, an arm 38 is mounted on a chassis C so as to support the pickup arm P, on which arm is journalled a moving frame $F_1$ rotatably around a horizontal shaft $h_1$. The moving frame $F_1$ is usually pulled downward at its back end by a spring 39 as shown in FIGURE 8 and the back end portion thereof abuts against a stopper 40 to prevent further rotation of the frame. On the free ends of the moving frame $F_1$, there is pivoted a supporting frame $F_2$ around a horizontal shaft $h_2$, and at its center portion a pickup arm P is provided rotatably around a vertical shaft *b* substantially horizontally. Thus, the pickup arm is made to be rotatable around the shaft *b* with minimal resistance. Accordingly it is noted that the pickup arm itself is not subjected to any spring force which is apt to turn the pickup arm horizontally. A spiral spring 41 is interposed between the supporting frame $F_2$ and the moving frame $F_1$. With this spiral spring, a pressure is produced for pressing on to the record 3 the stylus S which is mounted on the top of the pickup arm P. That is, the aforementioned spring 39 turns the moving frame $F_1$ to bring the free end of the pickup arm to the recard a certain distance away therefrom. In this case, the rotating position of the pickup arm is defined by the stopper 40 and further revolution of the pickup arm is effected by the spring 41 to determine the pressure of the stylus to the record.

For determining the starting position of play of the pickup arm P a stopper 42 is provided, by which the pickup arm P is held at the full-lined position in FIGURE 7. To this end, the stopper 42 is composed of a permanent magnet and an iron plate 43 is mounted on the pickup arm P so that when the iron plate attaches to the permanent magnet the pickup arm may be held there by a suitable force. It is of course possible to mount a permanent magnet on the pickup arm and to use an iron plate as the stopper.

The pickup arm goes on playing the record from the starting position in such a condition as shown in FIGURE 8, and when it reaches the position shown in the dotted line in FIGURE 7, namely when the play is finished, the moving frame $F_1$ is revolved clockwise around the shaft $h_1$ and the pickup arm is required to be automatically returned to the starting position. To perform this, a cam 44 is provided on the chassis C. This cam has a declining face towards the starting position and when the moving frame turns clockwise, namely when the pickup arm P rotates clockwise about the horizontal shaft $h_2$, it is brought to the starting position along the declining face of the cam 44.

Figure 9:
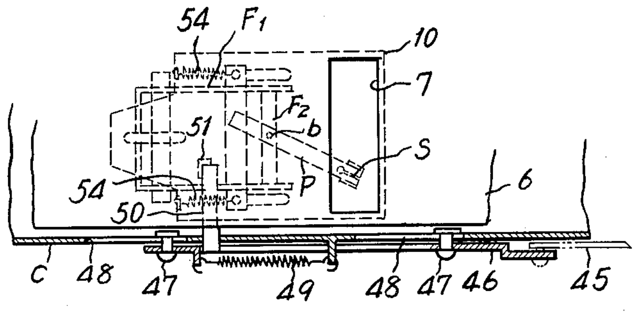
FIGURE 9 is a plan view showing a mechanism for operating the pickup arm in accordance with the opening and closing of the outer lid and another mechanism for opening and closing a window provided on the inner lid in accordance with the opening and closing of the outer lid in order to bring the top end of the pickup arm to the back of a record placed on the turn-table.
Figure 10:
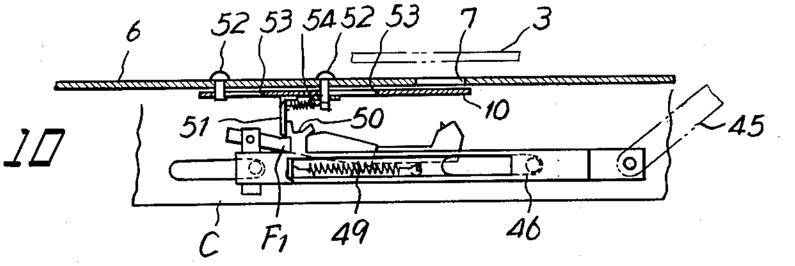
FIGURE 10 is its side sectional view.
Figure 11:
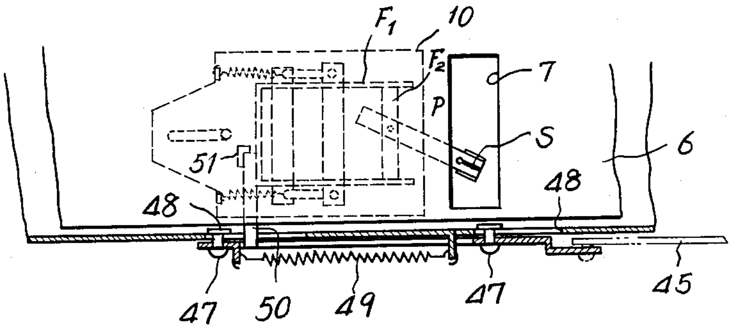
FIGURE 11 is a plan view showing a condition in which the window of the inner lid is open.
Figure 12:
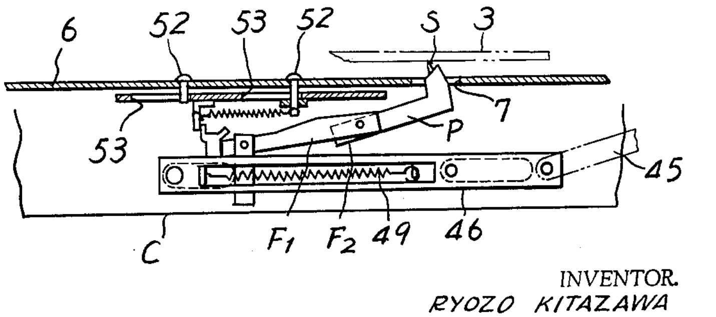
FIGURE 12 is a side sectional view of FIGURE 11, in which the top end of the pickup arm is contacting its stylus with the back of a record through the window.

In this invention, a mechanism is provided for controlling automatically the pickup arm in accordance with the opening and closing of the outer lid 8 as described previously. By opening and closing the window 7 provided on the inner lid 6 being associated with the mechanism, the top end of the pickup arm is made to go near the record through the window, thus playing the record. FIGURES 9 and 10 show a condition in which the record is not being played and FIGURES 11 and 12 show a condition in which the record is being played. The structure of the mechanism will be further explained. An arm 45 is provided associated with the connecting lever 9 which operates in accordance with the opening and closing of the outer lid 8. Then a slide plate 46 cooperating with the arm 45 is provided, on which guide pins 47 and 47 are mounted, these guide pins being fitted respectively into slots 48 and 48 of the chassis C and guiding the slide plate 46 right and left. 49 is its return spring. To the slide plate 46 is secured a controlling arm 50, which is associated with a projecting arm 51 attached to the sliding lid 10, thereby moving the sliding lid right and left.

The inner lid 6 is similarly provided with guide pins 52 and 52, which fit into slots 53 and 53 bored on the sliding lid 10 to guide the lid 6 right and left. A return spring 54 is also provided. The right end of the sliding lid 10 covers a window 7 bored in the inner lid 6 and goes back therefrom. In FIGURES 9 and 10 the window 7 is being covered by the sliding lid and in FIGURES 11 and 12 the window 7 is opened and the top end of the pickup arm P projects upwards through the window and the stylus S is brought into contact with the record.

Operations of the mechanisms described in the foregoing will hereinafter be explained briefly.

When lifting the outer lid 8 so as to put the record 3 into the case, the pickup arm P is placed at the starting position of play and the window 7 is covered by the sliding lid 10 as shown in FIGURES 9 and 10. The controlling arm 50 of the slide plate 40 holds down the moving frame $F_1$ against the spring 39 from above, placing the pickup arm at the starting position. Then, when the outer lid 8 is shut down after the record has been put in the case, the connecting lever 9, namely the arm 45 pushes the slide plate 46 and accordingly this sliding lid 10 moves to the left to open the window 7 as shown in FIGURES 11 and 12. In accordance with the movement of the slide plate 46 its controlling arm 50 travels to the left simultaneously. Consequently the moving frame $F_1$ turns round the shaft $h_1$ counterclockwise with the elasticity of the spring 39 and the supporting frame $F_2$ also moves upwards and then the top end of the pickup arm P goes near the surface of the record 3 through the window 7 until the stylus S makes contact with the record. At this time, connecting the motor M to the turntable 2 through the transmission mechanism T by rotating the knob 15, the turntable 2 begins to rotate and the amplifier is energized simultaneously and the knob 15 may be adjusted to a position of a suitable volume. Consequently, the pickup arm P begins to play the record along the grooves of the record without any outer resistance such as a spring force often encountered in a heretofore known record player. When completing play the pickup arm becomes as shown by the dotted line in FIGURE 7, so that when the outer lid 8 is shut down at this time the moving frame $F_1$ rotates clockwise around the shaft $h_1$ as previously explained and the top end of the pickup arm P goes down from the position in the dotted line in FIGURE 7. At this time, the pickup arm P gradually falls rotating clockwise around the shaft *b* by the cam 44 and finally comes to the position in the solid line, namely to the starting position of the play in FIGURE 7 and it is drawn by the permanent magnet 42 to be held at this place. In this case, the guide plate 46 and the sliding lid 10 return to their initial positions by their respective return springs 49 and 45. This is as shown in FIGURES 9 and 10.

As has been described in the foregoing, it is easily seen that the objects such as previously described may be effectively and accurately accomplished with the structure of this invention.

It will be apparent that many modifications and variations may be effected without departing from the scope of the novel concepts of this invention.

What is claimed is:

1. A record player comprising a pickup arm supporting frame turning on a horizontal shaft, a pickup arm pivoted with minimal resistance on a vertical shaft on said pickup arm supporting frame and having a stylus, a spring device interposed between said pickup arm supporting frame and its supporting part and rotating the pickup arm supporting frame to give the stylus a suitable pressure against a record, a rotation mechanism for bringing said pickup arm supporting frame to its predetermined operating position, a pickup arm return device having a declining face which guides said pickup arm in accordance with the rotation of said rotation mechanism from its play completing position to its starting position, and a magnet device for holding said pickup arm at its starting position.

2. A portable record player comprising a moving frame rotating around a horizontal shaft, a pickup arm supporting frame secured to the free end of said moving frame and rotating around the horizontal shaft, a pickup arm pivoted with minimal resistance on a vertical shaft on said pickup arm supporting frame and having a stylus, a spring device for operating said moving frame to bring said pickup arm to the position immediately before playing the record, another spring device which is interposed between said pickup arm supporting frame and moving frame for affording a suitable pressure to the stylus against a record, a rotation mechanism for turning said moving frame against said spring device attached thereto, a pickup arm return device having a declining face which guides said pickup arm in accordance with the rotation of said rotating mechanism from its play completing position to its starting position, and a magnet device for holding said pickup arm at its starting position.

3. A portable record player comprising a portable case, a driving motor, a turntable, both of which are contained in said case, a transmission mechanism for connecting said driving motor and said turntable, a knob for operating said transmission mechanism to insert it between said driving motor and said turntable, a moving frame connected to an outer lid and turning on a horizontal shaft when closing said outer lid, a pickup arm supporting frame secured to the free end of said moving frame and turning on a horizontal shaft, a pickup arm pivoted on a vertical shaft with minimal resistance on said pickup arm supporting frame and having a stylus, a spring device for rotating the moving frame so as to bring said pickup arm at its starting position, another spring device interposed between said pickup arm supporting frame and moving frame and rotating the pickup arm supporting frame for affording a suitable pressure to the stylus against a record, a rotation mechanism for rotating said moving frame against said spring device attached thereto, a pickup arm return device having a declining face which guides said pickup arm in accordance with the rotation of said rotating mechanism from its play completing position to its starting position, and a magnet device for holding said pickup arm at its starting position.

4. A portable record player comprising a portable case, a driving motor, a turntable, both of which are contained in said case, a transmission mechanism for connecting said driving motor and said turntable, an outer lid for said case, an inner lid having a window through which the top end of a pickup arm passes and approaches a record, a sliding lid for said window, an opening and closing mechanism for operating said sliding lid, a connecting lever mechanism for connecting said outer lid to said opening and closing mechanism to open said sliding lid when closing the outer lid, a moving frame connected to the opening and closing mechanism of said sliding lid and turning on a horizontal shaft, a pickup arm supporting frame secured to the free end of said moving frame and turning on a horizontal shaft, a pick-up arm pivoted on a vertical shaft with minimal resistance on said pickup arm supporting frame and having a stylus, a spring device for rotating the moving frame so as to bring said pickup arm at its starting position, another spring device interposed between said pickup arm supporting frame and moving frame and rotating the pickup arm supporting frame for affording a suitable pressure to the stylus against a record, a rotation mechanism for rotating said moving frame against said spring device attached thereto, a pickup arm return device having a declining face which guides said pickup arm in accordance with the rotation of said rotating mechanism from its play completing position to its starting position, and a magnet device for holding said pickup arm at its starting position.

5. A portable record player comprising a portable case, a driving motor, a turntable, both of which are contained in said case, a transmission mechanism for connecting said driving motor and said turntable, a knob for operating said transmission mechanism to insert it between said driving motor and said turntable, an outer lid for said case, an inner lid having a window through which the top end of a pickup arm passes and approaches a record, a sliding lid for said window, an opening and closing mechanism for operating said sliding lid, a connecting lever mechanism for connecting said outer lid to said opening and closing mechanism to open said sliding lid when closing the outer lid, a moving frame connected to the opening and closing mechanism of said sliding lid and turning on a horizontal shaft, a pickup arm supporting frame secured to the free end of said moving frame and turning on a horizontal shaft, a pickup arm pivoted on a vertical shaft with minimal resistance on said pickup arm supporting frame and having a stylus, a spring device for rotating the moving frame so as to bring said pickup arm at its starting position, another spring device interposed between said pickup arm supporting frame and moving frame and rotating the pickup arm supporting frame for affording a suitable pressure to the stylus against a record, a rotation mechanism for rotating said moving frame against said spring device attached thereto, a pickup arm return device having a declining face which guides said pickup arm in accordance with the rotation of said rotating mechanism from its play completing position to its starting position, and a magnet device for holding said pickup arm at its starting position.

References Cited by the Examiner

UNITED STATES PATENTS

| | | | |
|---|---|---|---|
| 2,622,883 | 12/1952 | Kurzen | 274—15 X |
| 3,027,164 | 3/1962 | Hasselbach et al. | 274—23 X |
| 3,051,493 | 8/1962 | Dreier | 274—23 |
| 3,162,450 | 12/1964 | Zimmerman | 274—23 |

NORTON ANSHER, *Primary Examiner.*

J. F. PETERS, Jr., *Assistant Examiner.*